United States Patent Office 3,140,315
Patented July 7, 1964

---

3,140,315
ALKYL-SUBSTITUTED HYDRAZINES AND HYDRAZONES AND PROCESS FOR PREPARATION THEREOF
Heinrich Klös and Hans Albert Offe, Wuppertal-Elberfeld, Germany, assignors to Farbenfabriken Bayer Aktiengesellschaft, Leverkusen, Germany, a corporation of Germany
No Drawing. Filed Feb. 16, 1960, Ser. No. 8,937
Claims priority, application Germany Feb. 18, 1959
11 Claims. (Cl. 260—566)

Alkylated hydrazines with or without further substituents in the hydrazine portion of the molecule whose alkyl groups carry free or substituted amino groups are valuable starting and intermediate products for the synthesis of dyestuffs, drugs, plant protectives, textile auxiliaries and the like on account of their polyfunctional nature. Some compounds of this class themselves exhibit remarkable pharmacological properties. It is, therefore, the more surprising that, hitherto, only a very small number of compounds of this class have become known and, moreover, have been obtained either in a very cumbersome way by many reaction steps thus giving a yield which is extremely poor or is in an impure state.

Thus, according to British patent specification No. 581-153, there was obtained from the potassium salt of phthalimide and α-ω-dichlorohexane the N-(ω-chlorohexyl)-phthalimide which is converted with hydrazine hydrate to give N-(ω-hydrazinohexyl)-phthalimide from which the bis-hydrochloride of 6-amino-1-hydrazino-hexane was obtained by saponification with hydrochloric acid. According to the data of the said patent specification, there were finally obtained from 120 g. of α-ω-dichlorohexane only about 10.5 g. of the said bis-hydrochloride corresponding to yield of barely 7% of the theoretical. The free base and its properties are not described at all.

According to German patent specification No. 503,135, (β-diethylaminoethyl)-aniline is treated with nitrous acid to give N-nitroso-(β-diethylaminoethyl)-aniline and then reduced to form 1-phenyl-1-(β-diethylaminoethyl)-hydrazine. However, it is expressly stated that during the reduction of the nitroso derivative a portion thereof is reconverted with the loss of ammonia into (β-diethylaminoethyl)-aniline which on account of the small boiling point difference between the latter and the desired hydrazine derivative, cannot be completely separated.

Other representatives of the class of basically alkylated hydrazines have hitherto not become known.

It has now been found that hydrazine and substituted hydrazines can easily be transformed in good yield into basically alkylated hydrazines, by treating them with esters from amino alcohols and strong acids and more particularly with salts of such esters, in the manner illustrated in greater detail and by way of example by the following formulae:

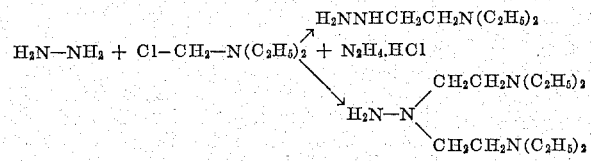

The substituted hydrazines used as starting materials may be substituted by alkyl, cycloalkyl, aryl, aralkyl or heterocyclic radicals. As examples, there may be mentioned methylhydrazine, N-N'-bis-isopropylhydrazine, cyclohexylhydrazine, phenylhydrazine, m-chlorophenylhydrazine, 2-4-dinitrophenylhydrazine, N-phenyl-N'-methylhydrazine, benzylhydrazine, α-pyridylhydrazine. In the case of hydrazines substituted by alkyl, cycloalkyl, aryl, aralkyl or heterocyclic radicals, the new basic alkyl radical combines with the nitrogen atom at the hydrazine portion already substituted, provided that a replaceable hydrogen atom is still available.

Esters from amino alcohols and strong acids have chiefly hydrohalic acids as acid component, principally hydrogen chloride. However, sulphuric acid or organic sulphonic acids, for example, may also be used as such acid components.

The amino group of these esters may be free, or completely or partially substituted by alkyl, cycloalkyl, aryl or heterocyclic radicals, or by acyl radicals of any type. Moreover, these substituents may form a heterocyclic ring, together with the nitrogen of the amino group for example the piperidine, morpholine, thiomorpholine, piperazine ring or the like. As examples, there may be mentioned α-dimethylamino-β-chlorethane and its hydrochloride, α-piperidino-β-tosyloxy-ethane and its salts, α-diethylamino-γ-propanol ester of methane-sulphonic acid, N-N'-bis-(β-bromethyl)-piperazine and its salts, the inner ammonium salt of aminoethanolsulphuric acid ester and the like.

However, the use of salts of those esters of amino-alcohols and strong acid has proved to be especially advantageous, since they are in most cases more readily available and less costly than the free esters. Moreover, they show substantially less tendency to self-polymerization or self-condensation than the majority of the free esters. Furthermore, practically all of them are very readily water-soluble and thus enable the work to be carried out in a homogeneous aqueous medium, particularly when using an unsubstituted hydrazine.

When the aminoalkyl radical enters into the hydrazine to be reacted, the acid component of the ester combines with the hydrogen atom of the hydrazine to be substituted to give the corresponding acid. In order to be able to carry out an amino-alkylation as complete as possible, this newly formed acid is expediently neutralized. This is achieved either by an appropriate excess of hydrazine to be reacted or by the addition of acid-binding agents which must however be completely removable from the final product as such or in the form of their conversion products. As acid-binding agents there may be used, for example the hydroxides or carbonates of alkali metals or alkaline earth metals, but also tertiary amines or quaternary ammonium bases and the like.

When working with salts of esters of aminoalcohols, the liberation of these esters from their salts is expediently effected by the addition of either a further excess of the hydrazine component or further amounts of alkalinizing substances such as are described in the preceding paragraph.

Depending on the proportions used of hydrazines and aminoalkyl esters or their salts, one or more aminoalkyl radicals may be introduced into the hydrazine whereby the further aminoalkyl radical initially joins that nitrogen atom of the hydrazine component already containing an aminoalkyl radical, provided that a replaceable hydrogen is still available. Since in most cases it is desirable to introduce only one aminoalkyl radical, a further excess of the hydrazine component is expediently used, all the more so since the latter can, in general, be relatively easily separated from the desired final product by distillation, the boiling points being sufficiently wide apart.

The reaction is expediently carried out in a solvent which is inert with regard to both reaction components, a reaction mixture as homogeneous as possible being especially advantageous. As solvents there may be considered, for example water, hydrocarbons, ether, dioxane, etc. If salts of aminoalkyl esters are to be brought to reaction, water has proved to be an especially advantageous solvent, since it permits an optimum homogeneity of the reaction mixture.

In order to have in every reaction step an optimum excess of the hydrazine component, the aminoalkyl ester or its salt is added to the hydrazine component, care being taken to get a very intimate mixing. If it is desired to add acid-binding agents, they may arbitrarily be added either to the hydrazine component itself or subsequently to the reaction mixture.

The reaction starts, in general, almost at room temperature, but for the completion of the reaction it is expedient to heat the mixture to 120–140° C. for several hours, otherwise prolonging the reaction time accordingly. After completion of the reaction, at least so much caustic alkali is added to the reaction mixture to enable all available acid ions to form an alkali metal salt of the respective acid. A generally valid instruction for the further working up of the reaction mixture and for the purification of the basically alkylated hydrazines cannot, however, be given, since both operations are largely determined by the individually different physical properties of the desired aminoalkyl hydrazines such as solubility in various solvents, boiling point etc. The methods preferably used are concentrating under normal or reduced pressure, filtering off any precipitated salts, taking up the basically alkylated hydrazines with solvents not dissolving the alkali metal salts formed. The final isolation and purification of the aminoalkyl hydrazines is always carried out by fractional distillation.

The yields of this process are very satisfactory and often reach 80–85% of the theoretical. Side reactions such as the splitting off of ammonia with formation of an amino group instead of the desired hydrazine group, occur in most cases only to a very immaterial extent and the undesired byproducts thus formed can always be removed comparatively easily.

Aminoalkylated hydrazines are strongly basic colourless or weakly yellowish more or less viscous oils which are fairly resistant to heating and can be distilled under vacuum and in some cases even under normal pressure without decomposition. If they do not contain further heavy substituents, they are volatile in steam, especially superheated steam; they are somewhat hygroscopic, though not to a large extent, and persistently retain water presumably with the formation of a hydrate. All of them are miscible with lower aliphatic alcohols such as methanol or ethanol and in most cases also with hydrocarbons or water. In the presence of strongly hydrophobic groups such as phenyl nuclei, the water-solubility is substantially reduced. Aminoalkyl hydrazines with a short alkyl radical and a free amino as well as a free hydrazino group such as $\beta$-amino-ethylhydrazine, are not or only sparingly soluble in hydrocarbons.

The aminoalkylated hydrazines still possess all properties typical of their functional groups. Some of them form with acids readily crystalline, readily water-soluble, but not markedly hygroscopic salts. If they still possess replaceable hydrogen atoms in the amino or hydrazino group, they can be alkylated or acylated by usual methods. Aminoalkyl hydrazines which still possess an unmodified $NH_2$ group in their hydrazine portion form with carbonyl groups, like all hydrazines of this type, the corresponding hydrazones. They are also suitable for other condensation reactions such as are known for example for phenylhydrazine. They are strong reducing agents in the manner known for phenyl hydrazine.

*Example 1*

Into 7 kg. of 80% hydrazine hydrate corresponding to 3.584 kg. of pure hydrazine base there is run with stirring at room temperature a solution of 4.2 kg. of 91% hydrochloride of $\beta$-diethylaminoethyl chloride in 5 litres of water whereupon the temperature rises to about 75° C. The mixture is then heated with stirring under normal pressure and 3 litres of aqueous distillate are thus distilled off which contains only a small quantity of hydrazine and/or aminoalkylated hydrazines. The mixture is then allowed to cool slightly and an amount of sodium hydroxide equivalent to the total chlorine content of the $\beta$-diethylaminoethyl chloride/hydrochloride used is added in the form of a 40–45% sodium hydroxide solution, while still vigorously stirring. Another 4 litres of the aqueous distillate are then distilled off with further stirring, if desired under slightly reduced pressure, which already contain substantial amounts of hydrazine and/or aminoalkylated hydrazines. Care should be taken for a thorough condensation of the distillate, in order to obviate losses of aminoalkylated hydrazines volatile in steam. The residue which has become pasty by precipitated sodium chloride is cooled and then stirred with about twice its volume of alcohol, cooled at least to room temperature, preferably to about 5° C., and the precipitated sodium chloride is filtered off with suction, and boiled with fresh alcohol to remove any adhering liquid, inter alia the aminoalkylated hydrazines. The aqueous alcoholic filtrate of the sodium chloride is freed again from alcohol and the bulk of water, first at atmospheric pressure, then under a low vacuum. The remaining residue is stirred again with three times its volume of alcohol, cooled again at least to room temperature, preferably to a lower temperature, and freed from the sodium chloride precipitated again which is boiled with fresh alcohol as described above. The new filtrate is dried first at room temperature, then in a vacuum which is gradually raised to about 10 mm. Hg. The dry residue, after the addition of an excess of sodium hydroxide solution, is treated with superheated steam, until no further basic substance distils off. The individual distillates containing alcohol, water, hydrazine hydrate and aminoalklated hydrazines in various proportions, are first freed on an effective column under normal pressure from alcohol, water and the bulk of hydrazine hydrate and then fractionated under a vacuum gradually raised to 30 mm. Hg, the fraction boiling at 70–120° C./30 mm. Hg contains the crude $\beta$-diethylaminoethyl hydrazine $(C_2H_5)_2N-CH_2-CH_2-NH-NH_2$ from which the pure product of M.P. 111–113° C. is obtained by rectification at 50 mm. Hg. In the residue of this crude distillation remains inter alia bis-($\beta$-diethylaminoethyl)-hydrazine which is obtained as a crude product in the fraction boiling up to 130° C./5 mm. Hg. It is expediently purified via its hydrazone with acetone boiling at 124–125° C./4 mm. Hg. After its saponification, analogous working up yields the pure N-N-bis-(diethylaminoethyl)-hydrazine

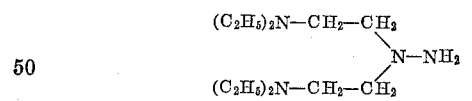

boiling at 100–102° C./4 mm. Hg. When using the above mentioned proportions of starting materials, the yield in mono-aminoalkylated product amounts to at least 60% of the theoretical, referred to the $\beta$-diethylaminoethyl hydrochloride employed, whilst a further 5–10% of the theoretical, again referred to said hydrochloride, are obtained as N - N - bis-($\beta$-diethylaminoethyl)-hydrazine. When using a smaller excess of hydrazine than indicated above, the amount of bis-aminoalkylated hydrazine increases to the detriment of the monoalkylated hydrazine. The mono-($\beta$-diethylaminoethyl)-hydrazine is a transparent somewhat viscous oil of a markedly basic odour which is arbitrarily miscible with methanol, ethanol, water, benzene and the like. It is fairly readily volatile in steam, especially superheated steam. Its aqueous solutions show a strongly alkaline reaction to phenolphthalein and reduce, especially upon slight heating, heavy metal salts to their lowest stage of oxidation or the metals themselves. The pure base does not change colour when standing in a closed bottle, but upon standing in the open air absorbs moisture and carbon dioxide from the latter and also turns somewhat brownish. $\beta$-diethylaminoethyl hydrazine forms salts with acids the majority of which dissolve very readily in water, in general also in alcohol, but without being markedly hygroscopic. With carbonyl compounds, it forms hydrazones those with a lower carbonyl radical such as the acetone radical are distillable under vacuum without decomposition. Other condensations such as are typical, for example, for phenyl-hydrazine can also be carried out with this compound. The physical and chemical properties of N-N-bis-(β-diethylaminoethyl)-hydrazine are completely analogous to those of the mono-aminoalkylated product. From the mono-aminoalkylated product there may be obtained a mono- and a bis-acetyl product, from the bis-aminoalkylated product only a monoacetyl derivative. The mono-aminoalkylated product may also be further alkylated, the newly introduced substituted or unsubstituted alkyl radical joining the nitrogen atom of the hydrazine portion which already carries the diethylaminoethyl radical.

*Example 2*

To an emulsion of 588 g. of phenylhydrazine in 1 litre of water there is added at room temperature with good stirring a solution of 240 g. of the hydrochloride of β-diethylaminoethyl chloride (89.5% commercial product) in 500 cc. of water. The internal temperature slowly rises by about 10–15° C., remains at this level for some time and then slowly falls again. To complete the reaction, the mixture is boiled under reflux with good stirring for about 2 hours, cooled to room temperature or even below, 350 g. of 40% sodium hydroxide solution are added and the mixture of unreacted phenylhydrazine and diethylaminoethylated product is taken up with benzene. After drying the benzene extract over potassium carbonate and driving off the solvent, this mixture is separated by fractional distillation and upon rectification of the diethylaminoethylated fraction, 135 g. of pure phenyl-(β-diethylaminoethyl)-hydrazine are obtained as a yellowish viscous oil boiling at 151–153° C./5 mm. Hg. When treating the latter with acetone, the corresponding hydrazone is formed which likewise boils as a pale yellow viscous oil at 137–138° C./4 mm. Hg and is evidence that the diethylaminoethyl radical has joined the same nitrogen atom which already carries the phenyl radical. The N-phenyl-(β-diethylamino-ethyl)-hydrazine

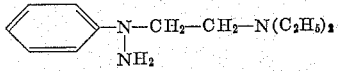

is arbitrarily miscible with lower aliphatic alcohols, hydrocarbons and ether, but sparingly soluble in water. It is a strong base which forms salts with acids the majority of which readily dissolve in water and lower aliphatic alcohols, but not in ether or benzene. After some time, when exposed to air or light, the free base darkens progressively, but remains clear and the original shade can be restored practically without loss by renewed distillation at any time. With acetone it yields the hydrazone described above and reacts in a similar manner with other aldehydes.

*Example 3*

To 6.25 kg. of 80% hydrazine, corresponding to 3.2 kg. of pure hydrazine base, there is added at room temperature with good stirring a solution of 2.82 kg. of sulphuric acid-mono-(β-aminoethanol)-ester in 3 litres of water and about 2 litres of water are distilled off under atmospheric pressure, while stirring is continued. To the somewhat cooled distillation residue there are added 3.64 kg. of 44% sodium hydroxide solution and a further 2 litres of aqueous distillate are distilled off with stirring, if desired under a low vacuum. By precipitation with alcohol and subsequent filtering off with suction the bulk of the sodium sulphate formed is removed in the same manner as described in Example 1 for the removal of sodium chloride. The final filtrate thus obtained which contains only very little sodium sulphate is dried initially under atmospheric pressure, then under a gradually increased vacuum. The dry residue and also the previously separated sodium sulphate are boiled out with alcohol in usual manner to remove residual bases. The whole of the distillates thus obtained are then freed from alcohol, water and the bulk of the hydrazine hydrate on an effective column at atmospheric pressure. Upon subsequent distillation at a pressure of 17 mm. Hg the residue yields a crude β-amino-ethyl-hydrazine of B.P. 75–110° C. from which at least 1650 g. of the pure product of B.P. 87–89° C./16 mm. Hg are obtained by repeated rectification. The β-aminoethyl-hydrazine $$NH_2-CH_2-CH_2-NH-NH_2$$

is a transparent strongly basic oil which is arbitrarily miscible with water and lower aliphatic alcohols, but insoluble or only sparingly soluble in hydrocarbons, ethers and similar inert organic solvents. With regard to its other physical properties it is very similar to the β-diethylaminoethyl-hydrazine described in Example 1.

We claim:

1. A compound selected from the group consisting of compounds having the following formulae:

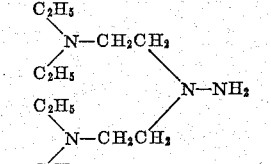

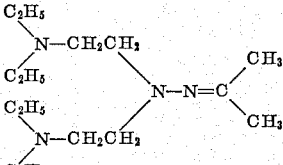

and

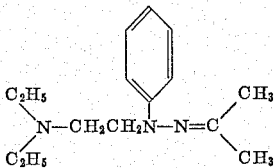

2. A compound of the formula

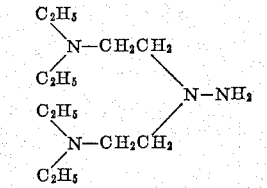

3. A compound of the formula

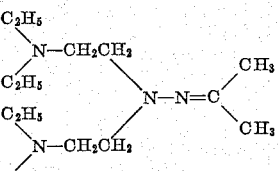

4. A compound of the formula

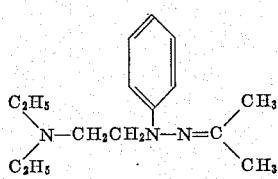

5. A process of preparing amino alkylated hydrazines having at least one alkyl substituent bearing a member selected from the group consisting of amino, dimethylamino, diethylamino and piperidine, said process comprising reacting an ester of an amino alcohol and an acid selected from the group consisting of hydrochloric acids, sulfuric acid and alkane sulfonic acids and salts of such esters with strong acids, with a member selected from the group consisting of hydrazine, hydrazine hydrate and the substitution products of said compounds containing substituents selected from the group consisting of alkyl, cycloalkyl, phenyl, m-chlorophenyl, 2,4-dinitrophenyl, benzyl and pyridyl, and having at least two free reactive hydrocarbon atoms the mol ratio of said amino alcohol ester to hydrazine group member being 1:4 to 8, at a temperature of from about 20 to 140° C. and recovering the amino alkylated hydrazine having at least two amino alkyl substituents thereby formed.

6. A process of preparing amino alkylated hydrazines comprising reacting hydrazine hydrate with the hydrochloride of β-diethylamino-ethyl chloride in a mol ratio of about 1:4 at a temperature of about 20 to 140° C. and recovering the amino alkylated hydrazines thereby formed.

7. Process according to claim 5, wherein a salt of an ester of an amino alcohol and a strong acid selected from the group consisting of hydrochloric acid, sulfuric acid and organic sulfonic acid is utilized in the said reaction.

8. Process according to claim 5, which comprises effecting said reaction in the presence of a solvent inert to said reaction components and in a medium as homogeneous as possible.

9. Process according to claim 8, wherein said solvent is water.

10. Process according to claim 5, which comprises utilizing in said reaction an acid binding agent selected from the group consisting of alkali metal and alkaline-earth metal, hydroxides and carbonates.

11. Process according to claim 5, which comprises utilizing an excess of said hydrazine group member as said acid binding agent.

References Cited in the file of this patent

FOREIGN PATENTS 503,135     Germany _____ Dec. 6, 1928

OTHER REFERENCES

Stoermer et al.: Ber. Deut. Chem., vol 28, pages 2220–2227 (1895).

Sommer et al.: Z. anorg. allgem. Chem., vol. 147, pages 142–155 (1925).

Westphal: Ber. Deut. Chem., vol. 74, pages 759–776 (1941).

Lockemann et al.: Ber. Deut. Chem., vol. 82, pp. 183–188 (1949).

Whitemore: "Organic Chemistry," second edition, page 180 (1951).

Goldschmidt et al.: Ann., vol. 595, pages 179–192 (1955).

Buchi et al.: Helv. Chim. Octo, vol. 41, pages 39 to 45 (1958).